United States Patent [19]

Gowans et al.

[11] Patent Number: 4,715,082
[45] Date of Patent: Dec. 29, 1987

[54] WINDSHIELD WIPER BLADE ASSEMBLY

[75] Inventors: Neil A. Gowans, Buffalo; William C. Riester, Williamsville, both of N.Y.

[73] Assignee: Trico Products Corporation, Buffalo, N.Y.

[21] Appl. No.: 414,009

[22] Filed: Sep. 2, 1982

[51] Int. Cl.⁴ .............................................. B60S 1/04
[52] U.S. Cl. .................................................. 15/250.42
[58] Field of Search ......................... 15/250.36–250.42

[56] References Cited

U.S. PATENT DOCUMENTS

| 1,953,903 | 4/1934 | Dirienzo | 15/250.40 |
| 3,141,186 | 7/1964 | Scinta | 15/250.42 |
| 3,885,265 | 5/1975 | Deibel | 15/250.42 |
| 3,911,523 | 10/1975 | Petrick | 15/250.42 |
| 3,952,360 | 4/1976 | Plisky et al. | 15/250.42 |
| 4,005,503 | 2/1977 | Harbison et al. | 15/250.42 |
| 4,009,503 | 3/1977 | Sharp | 15/250.42 |
| 4,177,538 | 12/1979 | Blaiklock et al. | 15/250.42 |

Primary Examiner—Harvey C. Hornsby
Assistant Examiner—Scott J. Haugland
Attorney, Agent, or Firm—E. Herbert Liss

[57] ABSTRACT

A windshield wiper blade superstructure is provided with one or more fin like depending projections. Slots are provided in the backing strip positioned to receive a corresponding depending projection to limit longitudinal displacement of the refill unit relative to the backing strip. The depending projections may be inclined on an edge to readily receive the refill unit.

7 Claims, 7 Drawing Figures

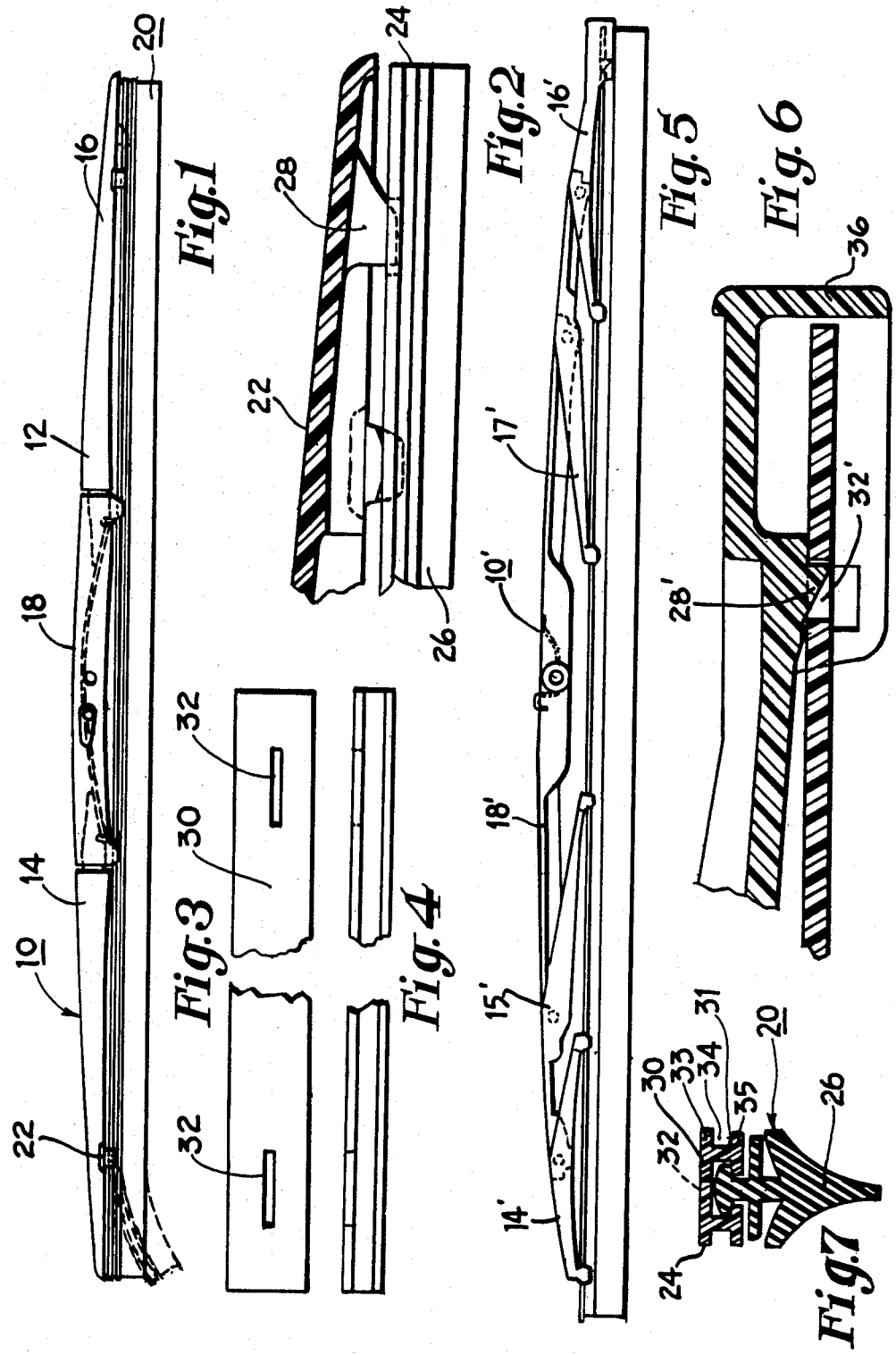

WINDSHIELD WIPER BLADE ASSEMBLY

BACKGROUND OF THE INVENTION

The invention is concerned with improvements in windshield wiper assemblies and, more particularly, with retention of the refill unit in the superstructure.

Windshield wipers for motor vehicles typically comprise a flexible or articulated superstructure which supports and distributes pressure along the length of a wiping element, often termed a "refill unit". The refill unit includes an elongate, stiff resilient backing strip which supports an elastomeric wiping element. A number of different means for retaining the blade unit in the superstructure have been commonly utilized. One of the most common means for retaining the refill unit against longitudinal displacement is a clip located at the end of the backing strip which engages a claw of the superstructure as shown in U.S. Pat. No. 3,253,254 to E. W. Lenz et al. Another retention means which comprises a notch in a widened portion of the packing strip is described in U.S. Pat. No. 3,141.186 to A. C. Scinta. U.S. Pat. No. 4,208,770 to W. D. Appel illustrates yet another retention means wherein the ends of the superstructure have depending abutments. The refill unit is slipped through a series of claws until one end of the backing strip engages an abutment at one end of the superstructure. Then either the superstructure or the refill unit is distorted so as to enable the other end of the refill unit to be positioned for engagement with an abutment at the opposite end. Various other forms of clips, abutments and notched elements are employed for retention purposes.

SUMMARY OF THE INVENTION

The present invention embodies a number of significant improvements which overcome the above mentioned objections, facilitate removal and replacement of the refill unit and provide for improved economy of production. The invention incorporates fin-like projections depending from the under surface of the superstructure which in operative position engage slots in the refill unit to limit longitudinal displacement. Excessive distortion of the refill unit during insertion is avoided and no distortion of the superstructure is required. By judicious location of the fins and the notches it is possible to insert the refill unit from either end thereof and into either end of the superstructure. No separate clips are required. Since the backing strip may be of constant configuration in cross section the extrusion process in manufacturing is facilitated.

The principal object of the present invention is to provide an improved wiper blade assembly with simplified removal and replacement means for the refill unit with improved retention against inadvertent longitudinal displacement, in which separate retention elements are eliminated and manufacturing economy is improved.

Other objects and advantages of the invention will become apparent from the following detailed description taken in connection with the accompanying drawings.

BRIEF DESCRIPTION OF THE DRAWINGS

FIG. 1 is a side elevational view of a windshield wiper blade assembly incorporating the invention;

FIG. 2 is a fragmentary side elevation partly in cross section of an end of the blade assembly;

FIG. 3 is a top plan view of the backing strip partly broken away;

FIG. 4 is a side elevational view (partly broken away) of the backing strip shown in FIG. 3;

FIG. 5 is a side elevational view of the wiper blade assembly illustrating another embodiment of the invention;

FIG. 6 is a fragmentary longitudinal cross section of an end of the superstructure of FIG. 5; and FIG. 7 is a transverse section of a refill unit.

DESCRIPTION OF THE INVENTION

A windshield wiper assembly 10 in the embodiment illustrated in FIGS. 1 to 4 comprises a flexible or articulated superstructure 12 of any suitable or desirable relatively rigid material such as, for example, a rigid plastic. End levers 14 and 16 are pivotally secured to a central or primary lever 18 in end to end relationship. A refill unit 20 is slidably supported by depending opposed claws 22 positioned at longitudinally spaced intervals along the length of the superstructure.

The refill unit 20 illustrated, by way of example, comprises a stiff, resilient, elongate backing strip 24 generally channel shaped in cross section which supports an elongate elastomeric wiping element 26. The backing strip 24 comprises an elongate web 30 and depending legs 31. On opposite sides of the backing strip are laterally open channels 34, each defined by upper and lower lateral flanges 33 and 35 respectively for slidably confining and bearing pressure from the claws of the superstructure 12.

Retention means for limiting longitudinal displacement of the refill unit 24 relative to the superstructure 12 comprises a fin-like projection 28, preferably adjacent the end of end lever 16 depending from the undersurface along the longitudinal center line of the superstructure 12 and a corresponding longitudinal slot 32 penetrating the web 30; the slot 32 is positioned to engage the fin-like projection when operatively assembled. The fin-like projection 28 may be inclined upwardly at one edge toward the outboard end of the lever 16, the opposite edge extends perpendicularly from the under surface of the end lever 16 to limit longitudinal displacement in one direction.

In the embodiment shown in FIGS. 1 to 4 the retention means includes interengaging means on the superstructure 12 and backing strip 24 comprising a second fin-like projection 28 and a second corresponding slot 32 penetrating the web 30 which limit relative longitudinal displacement in a second direction. The second fin-like projection 28 and slot 32 may be conveniently positioned the same distance from the end of the lever 14 and backing strip 24 as the previously described fin-like projection and slot with respect to lever 16 to thereby avoid the need for directional orientation when assembling.

To insert the refill unit 20 into operative position in the superstructure 12, the refill unit 20 is slipped longitudinally along the length of the superstructure 12 from right to left as seen in FIG. 1 through the claws 22. As the forward end of the backing strip 24 approaches the vertical edge of the fin-like projections 28 at the left end, the backing strip 24 is displaced downwardly as shown in broken lines in FIG. 1. Longitudinal movement of the refill unit 20 is continued until the slots 32 engage the fin-like projections 28 adjacent both ends simultaneously. There is sufficient tolerance between the length of the slots 32 and the engaging portion of the fin-like projections to permit slight longitudinal movement thereby permitting the rubber element to flex on curved surfaces of the windshield. When it is desired to remove the refill unit 20 either end of the backing strip 24 may be displaced downwardly from the superstructure 12 to relieve the engagement between the slot 32 and the fin-like projection 28. The refill unit 20 may then be moved longitudinally in the direction of the displaced end. The slot 32 at the opposite end will ride up the inclined edge of its corresponding fin-like projection 28 and disengage itself whereupon the refill unit may be lontitudinally moved out of engagement with the claws.

In accordance with the broader aspects of the invention it will of course be understood that the retention means may include other and diffrent means for limiting longitudinal movement in a second direction, as for example a crimp or struck down portion on the backing flanges in the vicinity of a claw, or both edges of a single fin-like projection may entend perpendicularly to the under surface of the superstructure. Other and different means may be employed for restricting movement in the second direction.

An example of a superstructure employing a single fin-like projection is illustrated in FIGS. 5 and 6. In this embodiment a flexible or articulated superstructure 10' is illustrated by way of example. It should of course be understood that the details of construction of the superstructure or backing strip form no part of this invention. Any suitable ones of many known types of superstructures and backing strips may be employed. In this instance the superstructure comprises a central primary lever 18', end levers 14' and 16' and intermediate levers 15' and 17' pivotally connected together in stacked relationship with the free ends of the levers 14', 15', 16' and 17' having opposed claws 22 for engagement with the laterally open channel 34 of the refill unit 20. At the end of the lever 16' there is provided an abutment 36. In the vicinity of the outermost claw 22 adjacent the abutment 36 there is provided a fin-like projection 28' having its outboard edge perpendicular to the under surface of the superstructure and its opposite edge inclined outwardly away from the under surface of the superstructure toward the abutment 36. A slot 32' penetrating the backing strip is provided at each end of the backing strip, each slot being positioned to engage the fin-like projection 28' in assembled position.

To insert the refill unit 20 into the backing strip, starting at either end, the refill unit may be slipped longitudinally through the claw 22 beginning at the end of superstructure 10' opposite the end having the abutment 36 with the claws 22 engaging the laterally open channels 34 and moved longitudinally through the claws 22. When the end of the refill unit approaches the fin-like projection 32' it will be cammed up the inclined edge of the fin-like projection until the slot 32 engages the projection, whereupon outward longitudinal movement in the direction whence it was inserted will be limited by the perpendicular edge of the fin. Longitudinal displacement in the opposite direction will be limited by the abutment 36. Thus only one fin-like projection is required.

It should now be apparent that a unique windshield wiper assembly has been provided which is positively retained for limited longitudinal movement and which requires no separate clips or other parts; no excessive distortion of either the superstructure or the backing strip is required for removal and insertion.

Although certain specific embodiments of the inention have been shown and described for the purposes of illustration it will be apparent that various other modifications and embodiments are possible within the scope of the invention. For example, other and different styles of superstructure may be employed; other and different types of fin-like projections may be utilized; other and different types of backing strips may be employed. The positions of the fin-like projections and the slots may be varied to suit the design of the superstructure and backing strip. It is to be understood, therefore, that the invention is not limited to the specific arrangements shown but in its broadest aspects it includes all equivalent embodiments and modifications which come within the scope of the invention.

What is claimed is:

1. A windshield wiper blade assembly having an elongated flexible pressure distributing superstructure and a wiper refill unit, means on said superstructure for slidably receiving said wiper refill unit, said wiper refill unit having an elastomeric wiping element supported by a stiff, resilient elongate backing strip and retention means for limiting longitudinal displacement of said refill unit relative to said superstructure, characterized in that said retention means comprises an integral fin-like projection depending from the undersurface of said superstructure on a medial longitudinal axis thereof and a slot penetrating said backing strip positioned to receive said depending projection when said refill until and said superstructure are operatively assembled.

2. A windshield wiper blade assembly assembly according to claim 1, characterized in that said fin-like projection is inclined at one edge and perpendicular to the plane of the undersurface of the superstructure at the opposite edge to facilitate assembly and disassembly and to limit longitudinal displacement in a first direction.

3. A windshield wiper blade assembly according to claim 2, characterized in that said retention means further includes means on said superstructure cooperating with means on said backing strip for limiting longitudinal displacement of said refill until relative to said superstructure in a second direction opposite said first direction.

4. A windshield wiper blade assembly according to claim 3 characterized in that said means on said superstructure comprises a second fin-like projection depending from the undersurface of said superstructure on a medial longitudinal axis thereof inclined at one edge perpendicular to the plane of the undersurface of the superstructure at the opposite edge, said means on said backing strip comprises a second slot penetrating said backing strip positioned to receive said second fin-like projection, said second fin-like projection and said second slot being longitudinally spaced from said first mentioned depending projection and slot, respectively, said perpendicular edges of said projections being disposed in face to face opposition.

5. A windshield wiper blade assembly according to claim 3 characterized in that said means on said superstructure comprises a depending abutment at the end of said superstructure in opposition to said perpendicular edge of said fin-like projection, said means on said backing strip being the end of the backing strip adjacent said depending abutment.

6. A windshield wiper blade assembly according to claim 5 characterized in that said backing strip includes a slot adjacent each end thereof positioned to receive said depending fin-like projection whereby said backing strip can be inserted into the superstructure from either end.

7. A windshield wiper blade assembly according to claim 4 characterized in that said first mentioned and said second fin-like projections and the corresponding slots are each spaced equally from the adjacent end of the superstructure and the backing strip respectively, whereby either end of the refill unit can be inserted from either end of the superstructure.

* * * * *